BALANCED TRANSISTOR TRANSLATING NETWORK

Filed Dec. 29, 1961 2 Sheets-Sheet 1

INVENTOR
P. A. REILING
BY Harry C. Hart
ATTORNEY

Aug. 24, 1965 P. A. REILING 3,202,939

BALANCED TRANSISTOR TRANSLATING NETWORK

Filed Dec. 29, 1961 2 Sheets-Sheet 2

INVENTOR
P. A. REILING
BY Harry C. Hart
ATTORNEY

United States Patent Office 3,202,939
Patented Aug. 24, 1965

3,202,939
BALANCED TRANSISTOR TRANSLATING NETWORK

Paul A. Reiling, Summit, N.J., assignor to Bell Telephone Laboratories, Incorporated, New York, N.Y., a corporation of New York Filed Dec. 29, 1961, Ser. No. 163,220
14 Claims. (Cl. 332—43)

This invention deals with balanced wave-translating networks utilizing transistors as their active elements. It has for its principal object to magnify the translated wave output developed by such a network.

A well known balanced circuit arrangement for amplification, modulation or detection of incoming electrical waves is one employing two like vacuum tubes interconnected in the "push-pull" configuration and biased for "class B" operation: The cathodes of the tubes are connected together and the voltage of the wave to be translated is applied, usually through a transformer, to their two grids in phase opposition; i.e., one grid is "pushed" while the other is "pulled." The tubes are biased, usually through a common path extending from their cathodes to a center tap of the input circuit, to the anode current "cutoff" point of their input-output characteristics; the points at which anode current ceases to flow. A signal of one polarity then drives one of the tubes into its condition of conduction and signal translation, simultaneously driving the other tube further into its cutoff condition. For an input voltage of opposite polarity, the two tubes interchange their roles. Thus one half of the available input voltage is always applied to the working tube and one half to the nonworking tube. Similarly, the output circuits of the two tubes become operative turn and turn about.

At low or moderate frequencies the same performance takes place when transistors are substituted for the vacuum tubes. At higher frequencies, however, effects that are peculiar to the transistor come into play and tend to vitiate the performance of the trnslating network and to introduce distortion into the translated output.

These effects originate in the phenomenon known as "minority carrier storage" that characterizes transistors and solid state diodes. A transistor does not commence immediately to translate a signal applied between its base electrode and its emitter electrode, nor does its collector current come to an abrupt stop when the applied signal is removed. Translation commences only after a finite, though very short, time during which minority carriers are injected into the semiconductor body by way of the emitter electrode in sufficient numbers to alter the distribution of potentials within the body in the fashion described, for example, in Bardeen-Brattain Patent 2,524,035; and collector current ceases to flow only after any excess of such stored minority carriers shall have been drained off. The minority carriers stored in each transistor during its working half cycle are drained off during the ensuing nonworking half cycle so that, when the next working half cycle arrives, the transistor is not yet ready to work but requires that its store of minority carriers be replenished. This situation makes for loss of control of the collector currents by the input voltage, and hence loss of efficacy of wave translation.

The present invention is predicated on the recognition that, within certain restrictions, the charge storage phenomenon can be turned to advantage. During the brief interval in which excess stored minority carriers are being drained out of the body of the nonworking transistor and back into the input circuit, the base-to-emitter resistance of that transistor is very low; much lower, indeed, than the "forward diode" resistance of the base-to-emitter path of the working transistor so that, while the drainage is in progress, the base electrode is effectively short-circuited to the emitter electrode and these input electrodes can support no voltage. By selection, for the active elements of the translating network, transistors whose minority carrier storage times are comparable with one-half period of the input wave, this abnormally low resistance and the consequent effective short circuit are caused to endure substantially throughout the nonworking half cycle of the input wave. By the scrupulous avoidance of the external low impedance path that conventionally interconnects the transistor bases with their emitters, substantially the entire input voltage is applied to the other (working) transistor throughout the short-circuited period of the nonworking transistor. Thus, in contrast to the application, as in the case of the push-pull class B arrangement, of one half of the available input voltage first to one transistor and then to the other, substantially the entire available input voltage is applied, first to one working transistor and then, in the next half cycle, to the other, which has in its turn become the working one; the effective input signal to the network has been doubled.

Doubling of the effective input voltage applied to each transistor increases its collector current and hence its output voltage. If the input-output characteristic of the transistor is approximately linear, desirable for amplification, the collector current increase is proportional to the input voltage increase, and doubling the one produces doubling of the other. If, as will usually be desirable for a detector or a modulator, the characteristic is upwardly curved, doubling of the effective input voltage more than doubles the collector current and hence the output voltage.

This effect is independent of the output circuit arrangement and hence of the use to which the translating network is put. Thus, if amplification alone is desired the output may be taken from the collector electrodes in push-pull while, if detection or frequency doubling is desired, the output may be taken from the collector electrodes in parallel. The same holds whether the individual transistor circuit be of the common emitter, common base or common collector configurations. By a small modification, two input signals, e.g., a high frequency carrier wave and a low frequency message wave, may be simultaneously applied to the network in which case the push-pull output is an amplified wave of the carrier frequency, modulated by the message, while the parallel output is a wave of twice the carrier frequency, similarly modulated.

The invention will be fully apprehended from the following detailed description of illustrative embodiments thereof taken in connection with the appended drawings in which.

Figure 1:
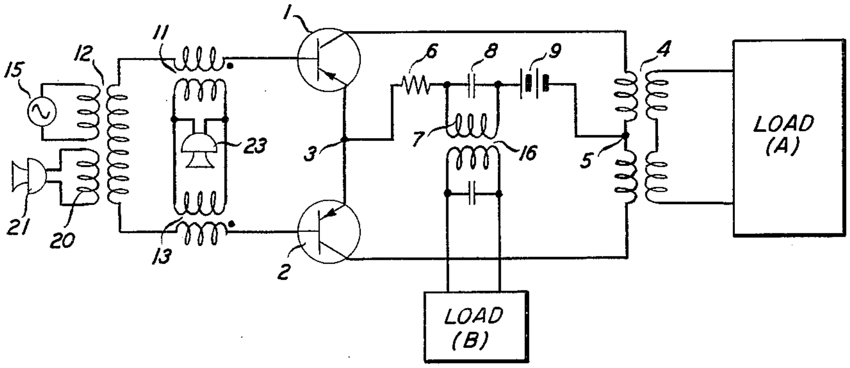
FIG. 1 is a schematic circuit diagram showing a push-pull wave translating network embodying the invention and employing two transistors connected in the common emitter configuration.

Referring now to the drawings, FIG. 1 shows two transistors 1, 2, each comprising a semiconductor body, an emitter electrode, a base electrode and a collector electrode. These transistors are individually arranged in circuits of the common emitter configuration, with their bases interconnected in push-pull. Their emitter electrodes are connected together and to a first common point 3. Their collector electrodes are connected together through the primary windings of an output transformer 4 of which a center tap provides a second common point 5. A path extending from the first common point 3 to the second common point 5 includes a load resistor 6, a coil 7 shunted by a condenser 8, and a battery 9, all in series. For the n-type transistors conventionally shown, the negative terminal of the battery 9 should be connected to the second common point 5, thus to apply negative operating potential to the collector electrodes of the transistors 1, 2. For p-type transistors it is only necessary to interchange the battery terminals.

The push-pull input circuit extends from the base of the upper transistor 1, through the secondary winding of a first modulating transformer 11, the secondary winding of the input transformer 12 and the secondary winding of a second modulating transformer 13 to the base electrode of the lower transistor 2, and this is the only external circuit path interconnecting the two base electrodes.

Disregarding, for the present, the modulating transformers 11, 13 and the message wave source which supplies them, a high frequency wave to be translated, and originating in a carrier wave source 15, is applied to the primary winding of the input transformer 12. This wave should be of such a frequency that each of its half cycles endures no longer than the excess minority carrier storage time in the semiconductor bodies of the transistors 1, 2. For example, the frequency of this source 15 may be 40 megacycles per second in which case a full cycle endures for 25 millimicroseconds and one-half cycle endures for 12.5 millimicroseconds. Transistors are readily available in commerce having charge storage times of this duration; and charge storage times can be determined, within limits, by control of fabrication processes according to well known techniques.

For translation in accordance with the invention of a wave of which the frequency is, illustratively, 40 megacycles per second, both of the transistors 1, 2 should have storage times that are at least equal to 12.5 millimicroseconds.

Unlike a vacuum tube, the conductivity between the base electrode of a transistor and its emitter electrode never goes to zero. Hence, whether a transistor be in the working condition or in the nonworking condition, its base electrode adopts a mean potential that is close to that of its emitter electrode. It so happens, furthermore, that when the base eletcrode is biased in this fashion, by body conduction through the transistor, it is biased substantially at its collector current cutoff in which case, ideally, a change of its base potential in one sense turns it "on," i.e., into its working condition while a change in the opposite sense merely turns it further "off."

But to the foregoing statement of the ideal situation there exists, as a practical matter and on a brief transient basis, a significant exception; namely, that when the transistor is first turned off, minority carriers, theretofore stored in the semiconductor body, are drained off through the base electrode, and the resulting transient current is accompanied by an insignificant voltage drop between base and emitter—i.e., during this brief period the base electrode is connected to the emitter electrode through a resistance of negligible magnitude: it is effectively short-circuited to the emitter electrode.

When, now, the voltage of the source 15 is applied, by way of the secondary winding of the input transformer 12, to the base electrodes of the transistors 1, 2, one of them is driven into its working state and the other is driven into its cutoff state, the latter being accompanied by the transient short circuit from the base of the cutoff transistor to its emitter. When the frequency of the input wave is coordinated with the transistor storage time in fashion described above, the transient short-circuit condition of the nonworking transistor endures throughout the nonworking half cycle of the input signal wave. Thus, virtually the entire voltage of the input signal wave is applied between the base electrode and the emitter electrode of the working transistor; i.e., the voltage applied to it is practically doubled as compared with the voltage that would have been applied to it through a conventional input circuit.

Hence the collector current of the working transistor is at least doubled. It flows through one primary winding of the output transformer 4 to the second common point 5, through the resonant circuit comprising the coil 7 and the condenser 8, through the load resistor 6, and to the first common point 3 that interconnects the emitter electrodes. On the ensuing half cycle of the input carrier wave, the transistors interchange their roles, the one that was most recently cut off and short-circuited now becoming the working transistor and vice versa so that collector current, again doubled, at least, as compared with that which would flow with a conventional push-pull translating network, now flows through the other primary winding of the output transformer 4 and through the same path that interconnects the first common point 3 with the second common point 5.

It is well known that, due to nonlinear aspects of the translation effected by a transistor, its output wave contains a number of components of different frequencies that may be expressed as individual "terms" of a series. It is also well known that, in the case of a "push-pull" output typified by the arrangement of the output transformer, the odd order terms appear while the even order terms are balanced out and that, in a path to which the two output electrodes are connected in parallel; e.g., the path interconnecting the first common point with the second common point, only the even order terms appear, the odd order terms being balanced out. Hence, if amplification is desired, a convenient circuit arrangement for withdrawal of the amplified signal frequency wave is provided by the secondary winding of the output transformer 4. If, to the contrary, detection, as of the message wave envelope of a modulated input carrier wave, is desired, the detected output, being the lowest order one of the even order terms, may be conveniently developed across the load resistor 6. To prevent masking the detected output by other undesired even order terms, the component frequencies that give rise to these terms may be blocked from the common path as by a tuned circuit that is proportioned to be resonant at the frequency to be blocked. Thus, the coil 7 and the condenser 8 may be proportioned to block the principal one of the undesired even order terms from the common path; namely, the second harmonic of the carrier frequency. Finally, situations may arise, especially in the case of modulation, in which it may be desired to transmit an harmonic, for example, the second harmonic, of the carrier wave frequency. To this end a subsidiary output transformer 16 may be provided of which the secondary winding is coupled to the coil of the harmonic blocking circuit. Undesired frequency components can be further reduced by the provision of additional filtering, e.g., by tuning this winding as well as the coil 7 to the same second harmonic.

As a practical matter the translating network of the invention will normally be employed only in one way, i.e., as an amplifier, a modulator or a detector. Hence only one of the three output circuits shown will normally be required, in which case the two others may be omitted. They are shown together in a single drawing to stress the general character of the invention.

The translating network of the invention may readily serve as a modulator. If conventional double sideband amplitude modulation is desired, the input transformer 12 may be provided with an auxiliary primary winding 20 supplied with a message wave derived, for example, from a microphone 21. The voltage of the modulating message wave is thus applied, like that of the high frequency carrier wave of the source 15, to the base electrodes of the transistors 1, 2 in push-pull. If it is desired to utilize, as the output wave of the network, that which appears at the terminals of the output transformer 4 and to exclude from this output components of the frequency of the message wave itself, the modulating wave may be applied to the transistor base electrodes in phase coincidence. To this end a message wave source such as a microphone 23 is connected in parallel to the primary windings of two auxiliary modulating transformers 11, 13 that are wound, as conventionally indicated by the dots, to apply voltages of like polarities to the two base electrodes at an instant. With this arrangement components of the collector currents at the modulating frequency are balanced in the primary windings of the output transformer 4 and hence generate no voltages in its secondary winding.

The two modulating signal sources 21, 23 and their associated transformer windings 11, 13, 20 are normally to be employed in the alternative, the preferred one being utilized and the other omitted. Situations may arise in which independent modulation of the carrier wave in different ways by different modulating signals may be desired in which case both of the modulating signal sources may be utilized together. Of course, in the case of amplification and detection, the modulating sources and their transformer windings should all be omitted.

Figure 2:
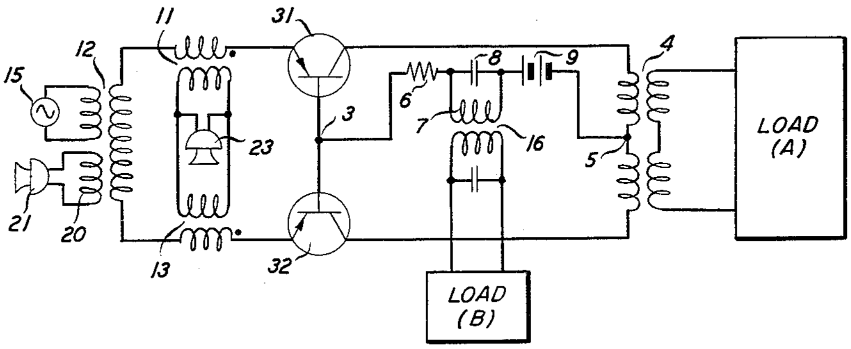
FIGS. 2 and 3 are schematic circuit diagrams showing alternatives to the network of FIG. 1 in which the individual transistors are connected in the common base configuration and in the common collector configuration, respectively.
Figure 3:
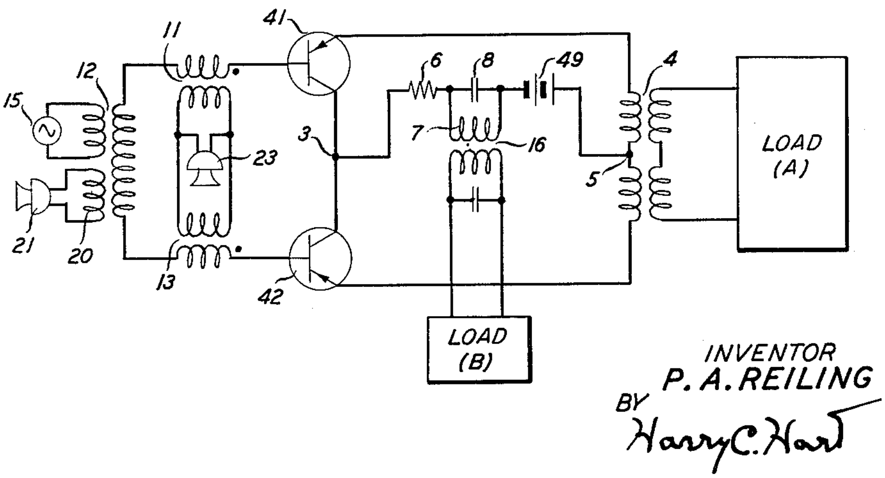

FIG. 2 shows a variant of FIG. 1, the only change being that the base electrodes of the two transistors 31, 32 are connected together and to the first common point 3, the push-pull input circuit extending between their emitter electrodes. FIG. 3 shows another variant in which, as in FIG. 1, the input circuit extends between the base electrodes. The collector electrodes of the two transistors 41, 42 are connected together and to the first common point 3 while the end terminals of the output transformer 4 interconnect the emitter electrodes. This requires an inversion of the polarity of the bias battery, as indicated for the battery 49. As in the case of FIG. 1 the input electrode and the common electrode of each transistor; i.e., emitter and base in the case of FIG. 2, base and collector in the case of FIG. 3, are connected together through only a single external circuit path which extends from one input electrode, through the secondary windings of the modulating transformers 11, 13 and of the input transformer 12 to the other input electrode. There is no tendency to degrade the voltage doubling effect of the invention by a shunt.

Figure 4:
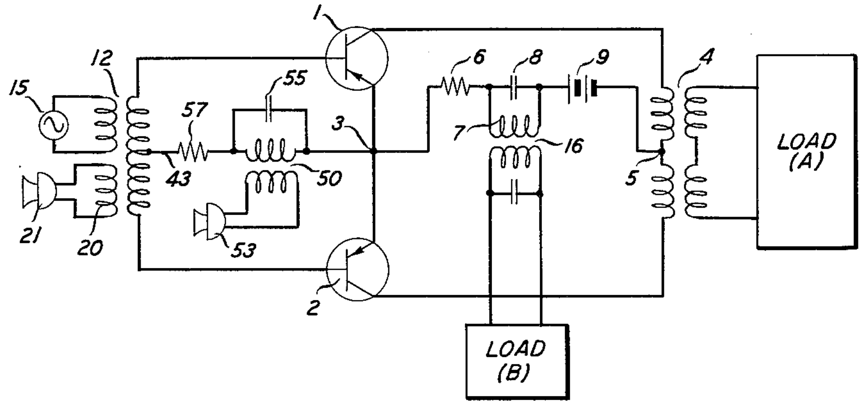
FIG. 4 is a circuit diagram showing a modification of the network of FIG. 1 and including a high impedance path extending from the emitter electrodes of the transistors to the center tap of the secondary winding of the input transformer.
Figure 5:
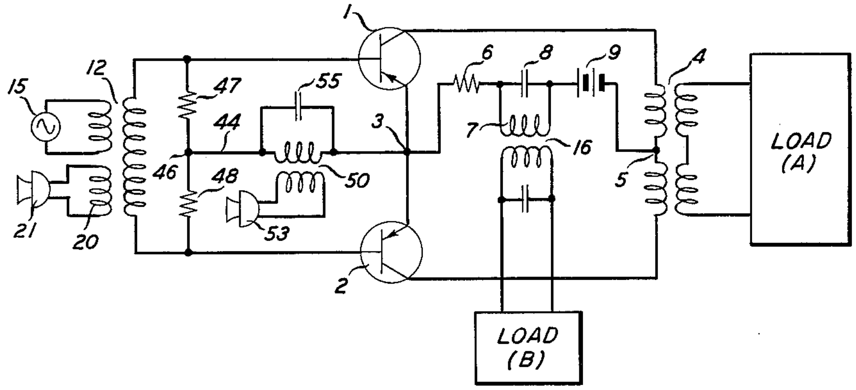
FIG. 5 is a schematic circuit diagram showing another modification of FIG. 1 in which the common path extends to a virtual center tap.

Situations may arise in which, for one reason or another, perfect balance among the two transistors of FIG. 1, FIG. 2 or FIG. 3 is difficult to obtain. Other situations may arise in which, for one reason or another, the potential biases of the two input electrodes require to be more firmly established than is possible through transistor body conduction alone. In either event, a circuit path extending from the common electrodes of the two transistors to a midpoint, actual or virtual, of the secondary winding of the input transformer 12 may solve a number of subsidary problems. Such a path 43 extending from the first common point 3 to an actual center tap of the secondary winding of the transformer 12 is shown in FIG. 4; and FIG. 5 shows a path 44 extending to the common point 46 of two like resistors 47, 48 that interconnect the end terminals of the secondary winding of the input transformer 12; i.e., to a virtual center tap. If care is exercised to make the resistances of these paths so large as to provide no appreciable shunting effect, the voltage doubling action proceeds as described above, albeit diminished, in principle, by the shunting effect which, in practice, may not be significant. In the event that such a central path is provided, modulation effected in FIG. 1 by the two auxiliary transformers 11, 13 may be more simply achieved by the substitution of a single auxiliary transformer 50 of which the secondary winding is included in this common path 43 or 44 while the primary winding is energized from a message wave source 53.

The shunting effect to be avoided is at the carrier frequency. Hence it can be avoided by blocking carrier frequency current components from the common path 43 or 44 of the input circuit. This may be conveniently achieved by shunting the secondary winding of the modulating transformer 50 by a condenser 55 proportioned to tune it to resonance at the carrier frequency. This permits a reduction in the magnitude of the resistor 57 included in the common path 43 and hence a reduction in power losses without the introduction of a corresponding shunting effect which, if it were introduced would tend to offset the voltage doubling effect secured by the invention.

Other variants and modifications of the illustrative embodiments shown and described above will suggest themselves to those skilled in the art. Moreover, as advances and improvements are made in the technology of transistor fabrication, the present limitations on the duration of the minority carrier storage phenomenon may become greatly enlarged. This will permit the instrumentation of the invention at correspondingly reduced frequencies.

What is claimed is:

1. Apparatus for translating a high frequency signal wave from a source to a load which comprises a pair of like transistors each having an input electrode, an output electrode and a common electrode, said common electrodes being directly connected together and to a first common point, said output electrodes being connected to a second common point, a path, including a potential source, extending from said first common point to said second common point, a load coupled to said output electrodes, an input transformer having a primary winding supplied with said signal wave and a secondary winding of which the end terminals are connected to said input electrodes, respectively, for applying signal voltages developed from said wave to said input electrodes in push-pull, whereby minority carriers are injected into said transistors in alternation and on alternate half cycles of said signal wave, thus to drive them into their working states, each of said transistors being so proportioned that the reverse-current drain of said minority carriers from its input electrode in its nonworking state endures for at least one-half period of said signal wave.

2. Apparatus as defined in claim 1 wherein the external circuit path interconnecting the input electrode of either transistor with its common electrode includes, in series, the input electrode and the common electrode of the other transistor.

3. Apparatus as defined in claim 1 wherein the mean potential of the base electrode of each transistor is determined solely by conduction through said transistors.

4. In combination with apparatus as defined in claim 1, a source of a modulating signal, and means for applying the signal of said of said source to the input electrodes of said transistors.

5. Apparatus as defined in claim 4 wherein said modulating signal source is coupled to said secondary winding, thereby to apply said modulating signal to said input electrodes in push-pull.

6. In combination with apparatus as defined in claim 4, a first auxiliary transformer of which the secondary winding is connected in series between the input electrode of one transistor and one end terminal of the secondary winding of said input transformer, a second auxiliary transformer of which the secondary winding is connected in series between the input terminal of the other transistor and the other end terminal of the secondary winding of said input transformer, and wherein the modulating signal source is connected to supply the primary windings of said auxiliary transformers in phase coincidence.

7. In combination with apparatus as defined in claim 1, a high impedance path extending from the first-named common point to the midpoint of the secondary winding of said input transformer.

8. In combination with apparatus as defined in claim 7, a source of a modulating signal, and an auxiliary transformer of which the primary winding is supplied by said source and of which the secondary winding is connected in series in said high impedance path.

9. In combination with apparatus as defined in claim 1, a high resistance path having a midpoint and extending between the end terminals of the secondary winding of the input transformer, and a low impedance path interconnecting the first-named common point with the resistance path midpoint.

10. In combination with apparatus as defined in claim 9, a source of a modulating signal, and a transformer having a primary winding supplied by said source and a secondary winding connected in series with said low impedance path.

11. Apparatus as defined in claim 1 wherein said load comprises a resistive element connected in series in the path extending between said first-named common point and said second-named common point.

12. Apparatus as defined in claim 1 wherein the path extending from the first-named common point to the second-named common point includes a reactive circuit, comprising inductance and capacitance, proportioned to be resonant at the frequency of the second harmonic of the applied signal wave.

13. Apparatus as defined in claim 12 wherein said load is inductively coupled to said reactive circuit.

14. In combination with apparatus as defined in claim 1, a transformer having a primary winding including end terminals and a midpoint terminal, said end terminals being connected to the output electrodes of said transistors, respectively, said midpoint terminal constituting the second-named common point.

References Cited by the Examiner

UNITED STATES PATENTS

| | | | |
|---|---|---|---|
| 2,644,925 | 7/53 | Koros | 332—31 |
| 2,788,493 | 4/57 | Zawels | 332—43 |
| 2,920,189 | 1/60 | Holmes | 329—101 |
| 2,962,674 | 11/60 | Whitnah | 332—43 |
| 2,989,628 | 6/61 | Horgan | 329—101 |
| 2,990,516 | 6/61 | Johannessen | 307—88.5 |
| 3,056,064 | 9/62 | Bourget | 307—88.5 |

ROY LAKE, *Primary Examiner.*

JOHN KOMINSKI, *Examiner.*